US006308163B1

(12) United States Patent
Du et al.

(10) Patent No.: US 6,308,163 B1
(45) Date of Patent: Oct. 23, 2001

(54) SYSTEM AND METHOD FOR ENTERPRISE WORKFLOW RESOURCE MANAGEMENT

(75) Inventors: Weimin Du, San Jose; James W. Davis, Sunnyvale; Ming-Chien Shan, Saratoga, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/270,885

(22) Filed: Mar. 16, 1999

(51) Int. Cl.$^7$ ............... G06F 17/60; G06F 19/00
(52) U.S. Cl. ............... 705/8; 709/226; 709/316; 707/10
(58) Field of Search ............... 705/8; 707/10, 707/103, 104; 709/201, 203, 226, 316; 714/100

(56) References Cited

U.S. PATENT DOCUMENTS

| 5,282,273 | * | 1/1994 | Ushio et al. | 709/218 |
| 5,535,322 | | 7/1996 | Hecht | 395/155 |
| 5,581,691 | | 12/1996 | Hsu et al. | 395/182.13 |
| 5,682,530 | * | 10/1997 | Shimamura | 709/104 |
| 5,696,697 | * | 12/1997 | Blau et al. | 707/103 |
| 5,758,078 | * | 5/1998 | Kurita et al. | 709/203 |
| 5,826,239 | | 10/1998 | Du et al. | 705/8 |
| 5,937,388 | * | 8/1999 | Davis et al. | 705/8 |
| 5,960,404 | * | 9/1999 | Chaar et al. | 705/8 |
| 6,154,787 | * | 11/2000 | Urevig et al. | 710/8 |
| 6,157,915 | * | 12/2000 | Bhaskaran et al. | 705/7 |
| 6,233,623 | | 5/2001 | Jeffords et al. | 709/316 |

FOREIGN PATENT DOCUMENTS

| 0686915-A2 | 12/1995 | (EP) | G06F/9/46 |
| WO-9905632-A1 | 2/1999 | (WO) | G06F/9/44 |

OTHER PUBLICATIONS

Krishnakumar et al. Managing Heterogeneous Multi–system Tasks to Support Enterprise–wide Operations. Distributed and Parallel Databases, 3, 1–33 (1995).*

Georgakopoulos et al. An Overview of Workflow Management: From Process Modeling to Workflow Automation Infrastructure. Distributed and Parallel Databases, 3, 119–153 (1995).*

Bussler et al. Policy Resolution for Workflow Management Systems. Proceedings 28th Hawaii International Conference on System Sciences, 1995, pp. 831–840.*

Du et al. Enterprise Workflow Resource Management. 1999. RIDE–VE '99. Proceedings: Ninth International Workshop on Research Issues on Data Engineering, 1999, pp. 108–115.*

* cited by examiner

Primary Examiner—Tariq R. Hafiz
Assistant Examiner—Dave Robertson

(57) ABSTRACT

A method and a system for providing resource management in workflow processing of an enterprise include a multi-level resource manager hierarchy. An upper level includes at least one resource manager having data that represents an enterprise-wide view of resource capabilities. A subordinate second level of resource managers provides partial views of the resource capabilities of the enterprise. These partial views may be based upon organizational or physical boundaries. At a lowermost level of resource managers are local resource managers (LRMs) that include data to track individual resources. Above this lowermost level, the resource managers in the hierarchy track the resources based upon types of resources. Thus, a second level resource manager is configured to be aware of availability of a resource type, but not the availability of an individual resource. Also above the lowermost level, the resource managers are configured to exchange requests for the resources using a number of different messages. A Plead message is used to send a request to a higher level manager. On the other hand, a Delegate message is used to send a request to a lower level manager. A Refer message allows a request to be sent horizontally. Report messages are sent among resource managers to allow updates of cache entries regarding capabilities of other resource managers.

18 Claims, 11 Drawing Sheets

US 6,308,163 B1

SYSTEM AND METHOD FOR ENTERPRISE WORKFLOW RESOURCE MANAGEMENT

TECHNICAL FIELD

The invention relates generally to workflow process management and more particularly to automating the coordination of process activities in order to accomplish tasks of an enterprise.

BACKGROUND ART

Workflow process management is a technology that provides the ability to define and automate the flow of work through an enterprise in order to accomplish business tasks. The business tasks may be first modeled as workflow processes, which are then automated by workflow management systems (WFMSs). Commercially available WFMSs, such as the Hewlett-Packard Changengine, are capable of supporting a large number of workflow processes in an efficient, reliable and secure manner.

A "workflow process" is a coordinated set of process activities that are connected in order to achieve a common business goal. Thus, a workflow process is typically a sequence of process activities. A "process activity" is a logical step or description of a piece of work that contributes to the accomplishment of the workflow process. A process activity can be executed manually or automatically. Each process activity is related to a work item and a workflow participant. A "work item" defines the work that is to be processed in the context of the related process activity and is performed by one or more workflow participants. A "workflow participant" is either a person that performs the work item for a manual process activity or a computer-based application that performs a work item for an automated process activity. "Resources" are defined as workflow participants and the objects that they utilize in performing work items.

A workflow participant can usually perform work items for more than one process activity. In the reverse, work items can generally be performed by more than one resident workflow participant. A workflow participant often requires use of or access to other resources when performing a work item. For example, a person that prints a document requires use of a printer. Workflow participants together with the objects that are used by the workflow participants are external resources for a WFMS.

One of the important features of modern WFMSs is the realization of dynamic resource allocation, which provides resource independence to business processes. Thus, a workflow process does not need to be modified when underlying resources change. Moreover, resources are more efficiently utilized. A modern WFMS includes a resource manager, which allows run time resource allocation. The resource manager provides a resource model for process designers to use for resource specification at process definition time. The model is an abstraction of the physical resources and shields the process designers from the detailed specification of the required resources. The resource manager also manages workflow resources (e.g., keeps track of status of resources) and assigns workflow resources to business steps (i.e., process activities) when requested to do so by a workflow execution engine.

One problem with resource management in WFMSs relates to efficiently assigning resources to process activities at process execution times when there are a number of workflow processes being executed simultaneously. Workflow resource management is concerned with: (1) keeping track of resource status (e.g., availability and load) and (2) finding eligible, available, and hopefully least loaded resources for workflow activities when needed. The resource management problem is not trivial in many workflow environments, since workflow resources are distributed, the number of work-flow resources are large, and resource status changes frequently.

Traditional approaches to workflow resource management have been to either manage distributed resources globally at a central site or to manage the distributed resources locally. Under the global management approach, the distributed resources are under control of a global resource manager (GRM). The resources are registered to the GRM, with an identification of the roles that the individual resources can assume. The GRM is responsible for keeping track of the status of each of the registered resources. The main advantage of the global management approach is that resource assignment is relatively easy and efficient, since all resource information is contained at a single site. However, this approach incurs huge overhead in keeping track of status of remote resources. The approach is impractical in many real workflow environments for a number of reasons. First, the number of remote resources can be large. For example, in the workflow process of providing employee expense reimbursement, a large corporation may have more than 10,000 employees as workflow resources. It is extremely difficult for the GRM to keep track of load information about remote resources, since the information changes frequently. Second, resources of a large enterprise usually belong to different organizations. Workflow resources at different organizations and locations are often managed by different systems independently. These external resource systems can be heterogeneous with respect to resource models, query language and communication protocol. Third, process designers need different views of workflow resources at different levels. Most business processes only involve local resources. On the other hand, there are cases in which an enterprise-wide view of all workflow resources is needed.

In the local management approach, resources are managed by multiple, distributed local resource managers (LRMs). Each LRM has all status information regarding resources and has full control over resources at its site. The approach may include utilizing a GRM at a central site to maintain role information for all the resources and their managing LRM, but resource management system relies on individual LRMs for resource assignment when a work item is to be performed. The local resource management approach avoids the huge overhead of keeping track of dynamic changes of resources by managing them locally. However, this approach makes run-time resource assignment difficult and sometimes inefficient.

A system that overcomes some of the problems of the two traditional approaches is described in U.S. Pat. No. 5,826,239 to Du et al., which is assigned to the assignee of the present invention. The system provides distributed resource management in a computer network that includes multiple computers operating under control of a WFMS which manages available resources to carry out a workflow process. Resources are grouped according to shared sets of capabilities. Each resource group includes at least one resource. One or more computers in the network stores a GRM and data to define the resource capability of at least some of the groups, and further stores the resource status for each group for which it has the data relating to resource capability. Preferably, each computer that does not store a GRM stores an LRM for at least one of the groups and includes data that defines the capability and the status for each resource in each group to which it is assigned. Thus, instead of doing resource management in one step, either at a central site (in the global management approach) or at remote sites (in the local management approach), the approach of Du et al. first checks the availability of resource groups at a central site and then selects (at remote sites) specific resources from the group.

FIG. 1 is a schematic view of a simplified workflow process. A workflow process is a description of sequencing, timing, dependency, data, physical agent location, and business rule and authorization policy enforcement requirements of business activities needed to enact work. An upper portion 10 of FIG. 1 represents the activities that are required to implement the workflow process, while the lower portion 12 represents the resources for executing the activities. The example is one in which a claim for payment is processed. In a first step 14, the claim is submitted. The enterprise that is represented in this example utilizes an employee 15 to receive the claim, but automated resources may be used by different enterprises to execute the step. In step 16, the claim is checked to determine whether it meets business requirements. The claim is also checked to determine the class 17 in which it is fit under procurement rules of the enterprise. The employee 15 enters the information from the claim into a computer 18. The computer may be one of a number of computers that are interconnected to form a network. Each computer is managed and controlled by a user or by a machine. The coordination of the computers within the network can be accomplished by computer software, such as object-oriented software. The determination of the class in activity 17 is part of the process management rules 19 of the enterprise in the execution of the workflow process. Workflow process activity information, such as resource data and rules, can be stored in a database on a centralized WFMS server, not shown, which is accessible by the computers 18 via a bus line. Alternatively, each computer may store the resource data and the rules.

The determination of the class at process activity 17 may merely be a determination of whether the submitted claim can be handled using petty cash or requires an authorization of a manager, as shown at activities 20 and 21. This determination may be based merely upon the dollar amount identified in the claim. If insufficient information is contained within the claim, the claim is resubmitted, as indicated at activity 22. The steps 17, 20, 21 and 22 are executed in computer software under control of the process management rules 19. If the claim can be processed using petty cash, the procedure ends at activity 23 by paying the persons who submitted the claim. The resource for executing this activity may be an employee 24 or may be an automated device. For claims that require manager authorization, an activity 25 of recognizing the authorization is executed in computer software 26. For example, electronic signatures may be required in order to allow automated processing.

A claim which does not include the required authorization may be rejected at activity 27, so that the process is completed at activity 28. Resources for implementing these activities may be a printer 29 that outputs an explanation to the person that submitted the claim and a delivery system 30 that may include mailing or electronically transmitting the explanation to the person that submitted the claim.

When the required authorization is provided for the submitted claim, the appropriate activity 31 is to notify the payroll department, which can initiate the payment process at activity 32. Notification may be provided by a facsimile device 33. The initiation of the payment process may require a handoff 34 of the processing to a second workflow process that requires additional resources.

In the operation of the WFMS of Du et al., the GRM is invoked with a request for a specific activity, such as a request for the facsimile device 33 to transmit notice to the payroll department in order to execute activity 31. The GRM responds by checking the stored capabilities and the status of the resource groups, selecting one of the resource groups having the capability to perform the specific activity and having the status that enables the group to do so, and forwarding the request to the LRM of the computer that is specific to the selected resource group. The LRM of the specific computer can respond to the request by selecting one of the resources (e.g., one of the available facsimile devices) in the selected resource group to perform the specified activity and by assigning the activity to the selected resource. The LRM then updates the stored status data of the resource and forwards the updated status data to the GRM.

While the approach of Du et al. provides a significant reduction in operation overhead without introducing long delays in run-time resource assignment, further improvements are desired. Specifically, what is needed is a method and system for providing resource management such that the flexibility and the scalability of implementation are enhanced. What is further needed is such a method and system that allow different views of workflow resources at different levels of an enterprise, while still providing an enterprise-wide view of all workflow resources.

SUMMARY OF THE INVENTION

A method for providing resource management in an enterprise and a system for implementing the method support different views of enterprise workflow resources by providing at least three levels of resource managers. The multi-level resource management hierarchy is combined with inter-level and intra-level communication techniques (i.e., a resource query processing algorithm and an interaction protocol) for efficient distributed resource management. The method and the system provide a capability-based resource hierarchy for modeling static resource characteristics and a rule-based resource policy manager for dealing with dynamic resource properties.

In order to accommodate wide distribution of enterprise workflow resources across organizational and physical boundaries, resource management is also distributed. To support different views of enterprise workflow resources, global resource managers (GRMs) are subdivided into Enterprise GRMs (ERMs) and Site GRMs (SRMs). ERMs represent the enterprise-wide view of workflow resources and interface with the underlying SRMs, which represent partial views of workflow resources based upon organizational or physical boundaries.

There may be more than one level of SRMs in order to represent different levels of views. Thus, a tree hierarchy of resource managers is formed, with ERMs as roots. SRMs at the same level represent views in different organizations or within different physical boundaries. In other than the lowest level, an SRM is an integrated view of its subordinate SRMs. The lowest level SRM represents imported and possibly integrated views of one or more external local resource manager (LRM).

There can be more than one ERM. All of the ERMs represent the same enterprise-wide view of the enterprise workflow resources, but may provide variations in fault tolerance.

The LRMs may have different resource models and communication protocols, since they may be designed for unique purposes and may use different resource models and technologies. However, the GRMs (i.e., ERMs and SRMs) represent integrated views of part or all of the underlying LRMs. All of the GRMs utilize the same resource model and the same communication protocol.

In the preferred embodiment, each SRM and ERM has an architecture that is formed of four layers: the interface layer, the policy manager and resource model layer, the request processing engine layer, and the integration layer. The interface layer allows other components (e.g., a workflow engine) to send requests to the GRM and allows communication with other GRMs. Moreover, the interface layer provides administrative and security features. The policy manager and resource model layer implements the policy rules and the resource model. This layer also provides a database having an extensive schema that is used to store model and historical information and may be used to store other information needed for resource management. The request processing engine layer routes the actual requests to the appropriate information sources. It also assembles all of the results that are returned by information sources. Finally, the integration layer manages all of the different protocols utilized by local information sources, such as the LRMs. The integration layer enables the LRMs to be advertised and manages the wrappers that need to go around each LRM.

The four layers are employed to provide a response query algorithm that maps physical resources to workflow activities based on the resource model and policies. When a request reaches a particular GRM, the first step is to determine whether the GRM can handle the request. If not, the request is passed to another resource manager. On the other, if the receiving GRM is able to handle the request, the request is passed to a policy engine component that provides query rewrite. After the policy enforcement, the request is forwarded to a resource engine, which determines whether a particular resource can be found to satisfy the request. If an appropriate resource is found, an appropriate return is generated. However, if no resource is found, the request is sent to a policy engine, which applies substitution policies. When an appropriate resource is found in view of the substitution policies, an appropriate result is generated. If not, a NULL is returned.

Preferably, the system utilizes a resource model that is a hierarchical collection of resource types. A resource type is used to organize resources into groups of resource instances with the same capabilities. The resource hierarchy shows resources organized into types. Each of the types in the hierarchy has a list of capability attributes, which represent its capabilities. Furthermore, a resource type inherits capabilities (attributes) from its parents. Each type in the resource model of a resource manager has four fields. A first field relates to the ability of resource managers to satisfy requests for the resource. The second field relates to delegating satisfaction of a request for the resource at a lower level resource manager in the hierarchy. The third field is the address of cache that represents a same level resource manager that has been discovered as being able to satisfy a request or the resource. The fourth field is an address of a resource manager that can satisfy requests for the resource, but at a higher level in the resource manager hierarchy.

An interaction protocol among the resource managers is also important to efficient distributed resource management. There are four types of messages that a GRM can send to another GRM: Plead, Delegate, Refer and Report. A Plead is used by a GRM to send a request to a higher level GRM. On the other hand, the Delegate message is used by a GRM to send a request to a lower level GRM. A Refer message allows a GRM to pass a request to other GRMs that are horizontally positioned in the hierarchy. The Report message is a response sent back to a GRM which originated a request. This message is used to create and update cache entries at the originating GRM. Cache among the SRMs does not have to be consistent. While it is not within the same protocol, a Do message is a message that is sent from a resource manager to a local resource manager that has direct control over the resource to be used to satisfy a resource request.

The resource management system and method provide a number of advantages. Efficient resource mapping based on a hierarchical resource model is enabled, as well as flexible resource handling using resource policies. Moreover, the system and method allow different types of local resource managers (i.e., database, corporate directory, or any legacy applications) to be integrated and local resources to be mapped to the global resource model. Another advantage is that the system and method allow for distributed resource management that crosses organization boundaries without compromising local autonomy by deploying multi-level resource management hierarchy. As another advantage, the system and method can easily scale up to handle a large number of resources at the enterprise level. Additionally, the system and method enable efficient assignment of resources at any level and by any GRM using the interaction protocol for communications among the resource managers.

DETAILED DESCRIPTION

Figure 1:
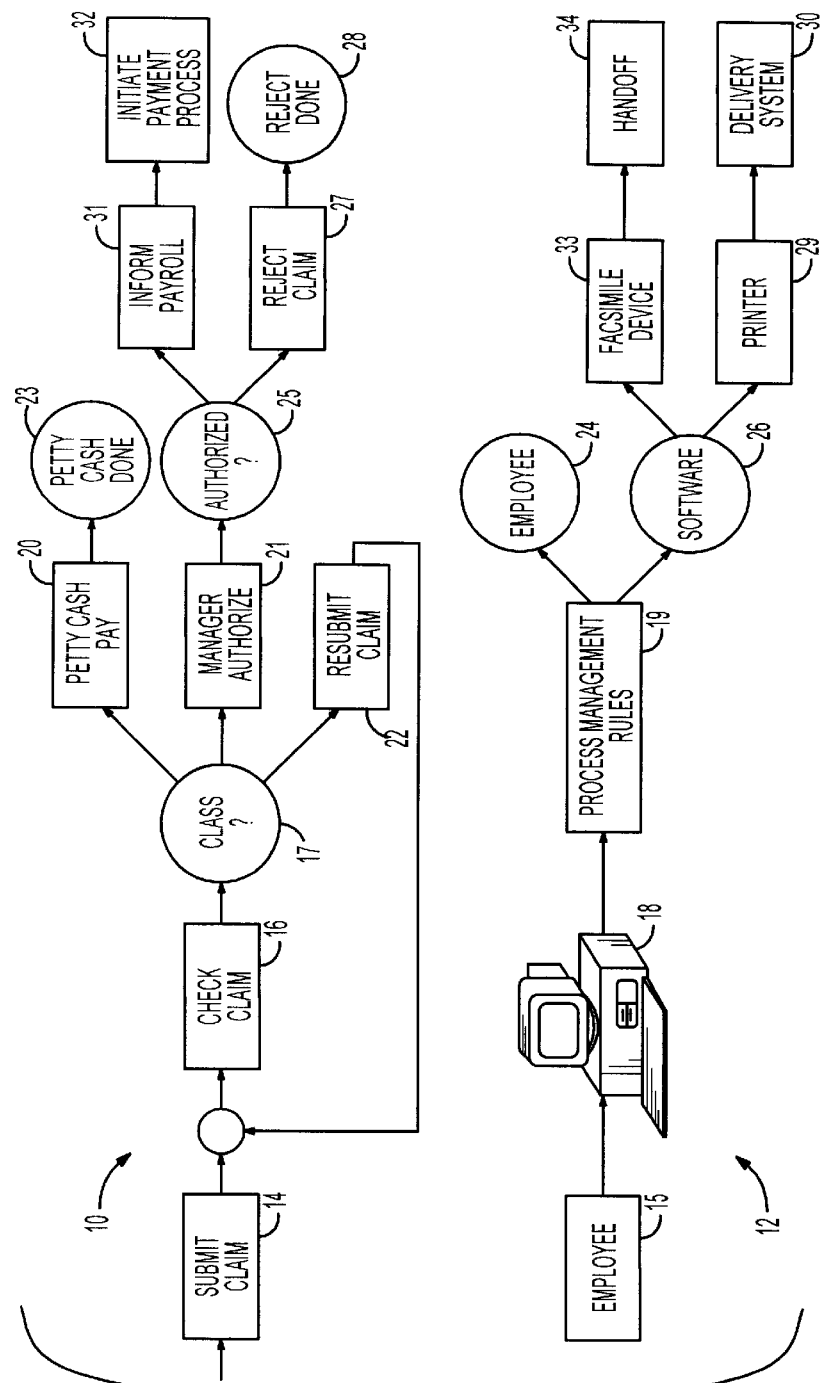
FIG. 1 is a schematic representation of a workflow process in accordance with either the prior art or the present invention.
Figure 2:
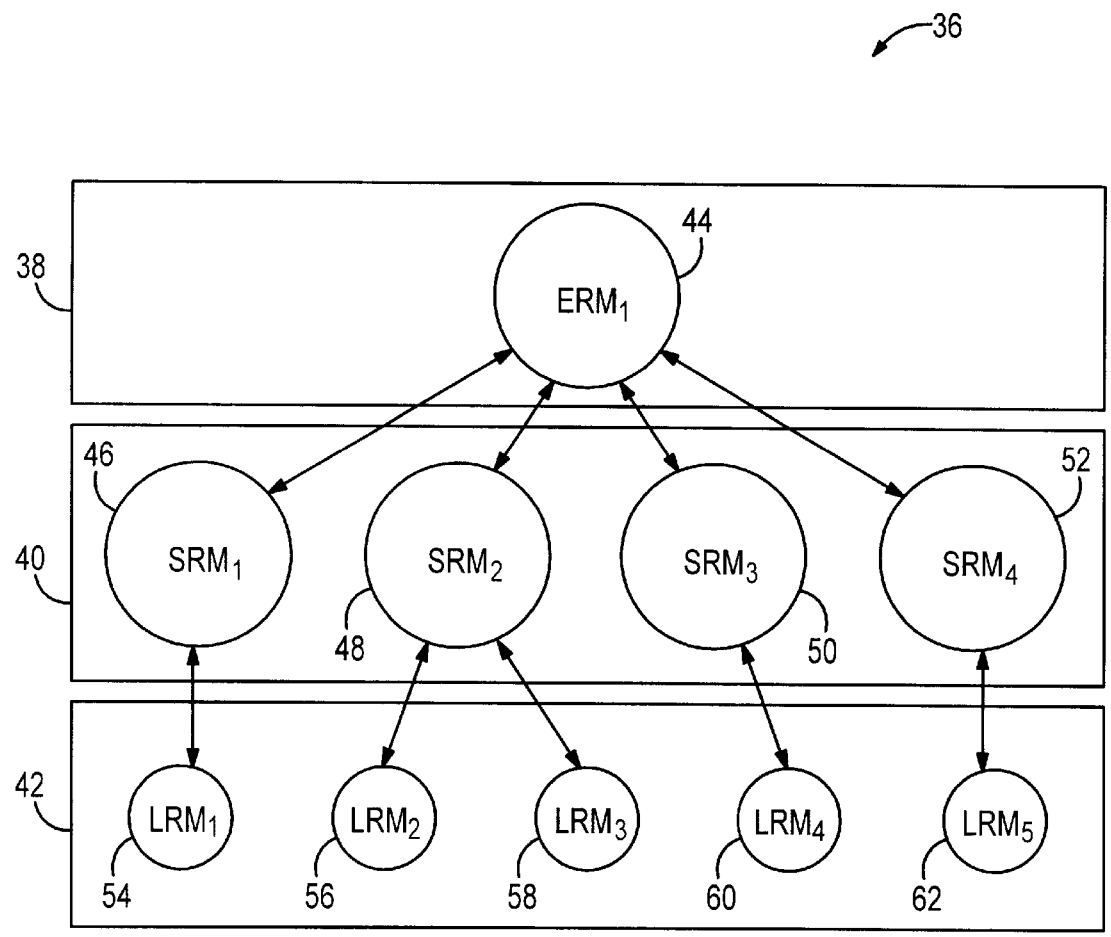
FIG. 2 is a block diagram of a three-tier hierarchy of resource managers in accordance with one embodiment of the present invention.

With reference to FIG. 2, a hierarchy of an enterprise workflow resource management system (WFMS) 36 is shown as having at least three levels 38, 40 and 42 of resource managers. Since enterprise workflow resources can be widely distributed across organizational and physical boundaries, resource management is distributed. That is, the multi-tier system is highly compatible with large scale business architectures. Moreover, the multi-tier system supports different views of enterprise workflow resources. The different views are provided by dividing the global resource managers (GRMs) of the above-cited Du et al. system (U.S. Pat. No. 5,826,239) into enterprise GRMs (ERMs) and site GRMs (SRMs).

In the embodiment of FIG. 2, there is only one ERM 44. The ERM represents the enterprise-wide view of workflow resources. Thus, the ERM 44 provides an overview of the capabilities of the entire system 36.

The ERM 44 interfaces with the underlying SRMs 46, 48, 50 and 52. Each SRM represents a partial view of workflow resources. The partial views may be based upon organizational boundaries or physical boundaries. For example, the $SRM_1$, may be specific to a first building of a campus of buildings of an enterprise. The other three SRMs may be specific to other buildings on the same campus. Alternatively, the SRMs may be specific to different locations of an enterprise having sites in different cities or countries. The SRMs report to the ERM 44. While not shown in FIG. 2, the SRMs are able to communicate with each other using the interaction protocol to be described below.

The third tier 42 includes LRMs 54, 56, 58, 60 and 62. Each LRM is dedicated to a group of resources. In the preferred embodiment, the WFMS 36 utilizes a resource model that is a hierarchical collection of resource types. A resource type is used to organize resources into groups of resource instances having the same capabilities. The individual LRMs have information regarding and full control over the resources that they manage. The LRMs include individual resource databases which keep track of static information such as roles and addresses, as well as dynamic status information such as availability and workload. The LRM for a selected group maps the group into individual resources and checks their availability and workloads. When a request is received from an SRM 46–52, an available resource is selected by the receiving LRM. The selected resource is then informed or invoked to perform the work item specified in the request.

The LRMs 54–62 interact with the SRMs 46–52. The SRMs represent imported and possibly integrated views of one or more external LRMs. For example, the $SRM_2$ 48 provides an integrated view of $LRM_2$ 56 and $LRM_3$ 58. During operation, the $SRM_2$ has information regarding availability of resources managed by the two underlying LRMs. However, the $SRM_2$ is not aware of availability of individual resources, since the availability information sent from an LRM relates to status of a resource group. The number of resource groups is significantly smaller than the number of individual resources. While the status of an individual resource may change frequently, the status of a resource group changes much less frequently. Thus, there is a reduction in the overhead of tracking resource availability at the SRM level 40.

By dividing the WFMS 36 into the three levels 38, 40 and 42, an enterprise-wide view of all workflow resources is provided, while still allowing independence among organizations and locations within the enterprise. The external resource managers, such as LRMs 54–62, may be heterogenous with respect to query languages and communication protocols. However, cooperation within the enterprise is maintained by using a common query processing algorithm and interaction protocol at the middle level 40 and upper level 38, since it is not important for $SRM_1$ 46 to communicate with $LRM_2$ 56 and $LRM_3$ 58 if the four SRMs 46–52 are able to communicate.

Figure 3:
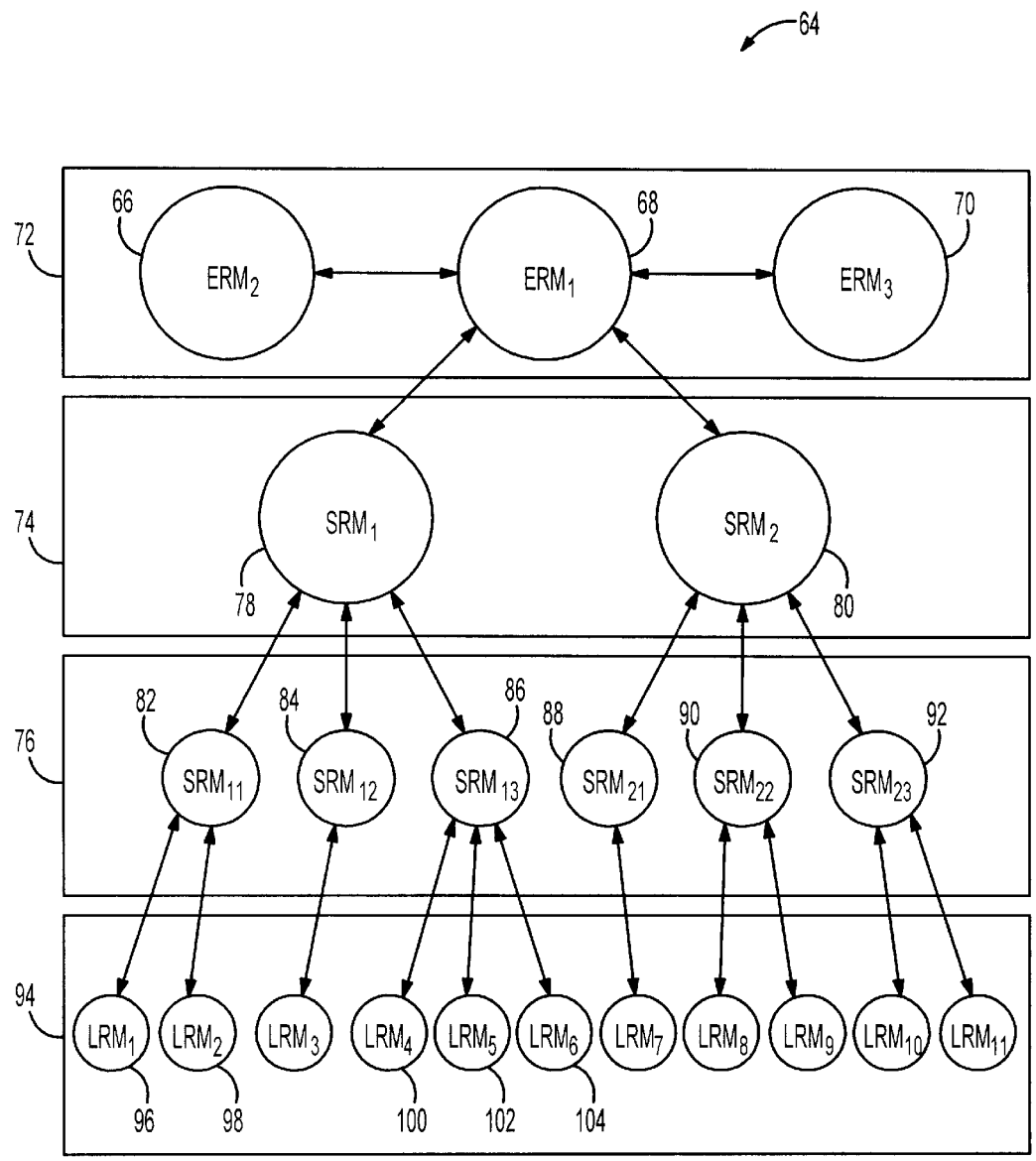
FIG. 3 is a block diagram of a second embodiment of a hierarchy of resource managers in accordance with the invention.

Optionally, there may be more than one ERM at the top level and there may be more than one level of SRMs. Referring now to FIG. 3, a second embodiment of a WFMS 64 is shown as including three ERMs 66, 68 and 70 within the top level 72 of the system. Each of the ERMs 66–70 represents the same view of the enterprise workflow resources, but with a variation in operation. For example, each ERM may be unique with respect to providing fault tolerance.

The WFMS 64 also includes two levels 74 and 76 of SRMs 78, 80, 82, 84, 86, 88, 90 and 92. Each level represents a different level of view. For example, the two SRMs 78 and 80 may be geographically based, while the SRMs 82–92 in level 76 are organizationally based. This architecture is particularly useful for enterprises having facilities in more than one city and having multiple substantially independent organizations at each facility.

In the same manner that the SRMs 78 and 80 of level 74 represent integrated views of the subordinate SRMs 82–92, the SRMs of level 76 provide integrated views of the LRMs at the lowest level 94. SRM 82 provides an integrated view of LRMs 96 and 98, while the SRM 86 contains information that enables an integrated view of LRMs 100, 102 and 104.

Additional layers of SRMs may be added to the architecture of FIG. 3. An advantage of the architecture is that it allows different kinds of local resource managers (e.g., database, corporate directory, or other legacy applications) to be integrated into a global resource model. Moreover, local resources can be easily mapped to the global resource model. The multi-tier system allows for distributed resource management that crosses organization boundaries without compromising local autonomy. Additionally, the system can be easily increased in scale to handle large numbers of resources at the enterprise level.

Figure 4:
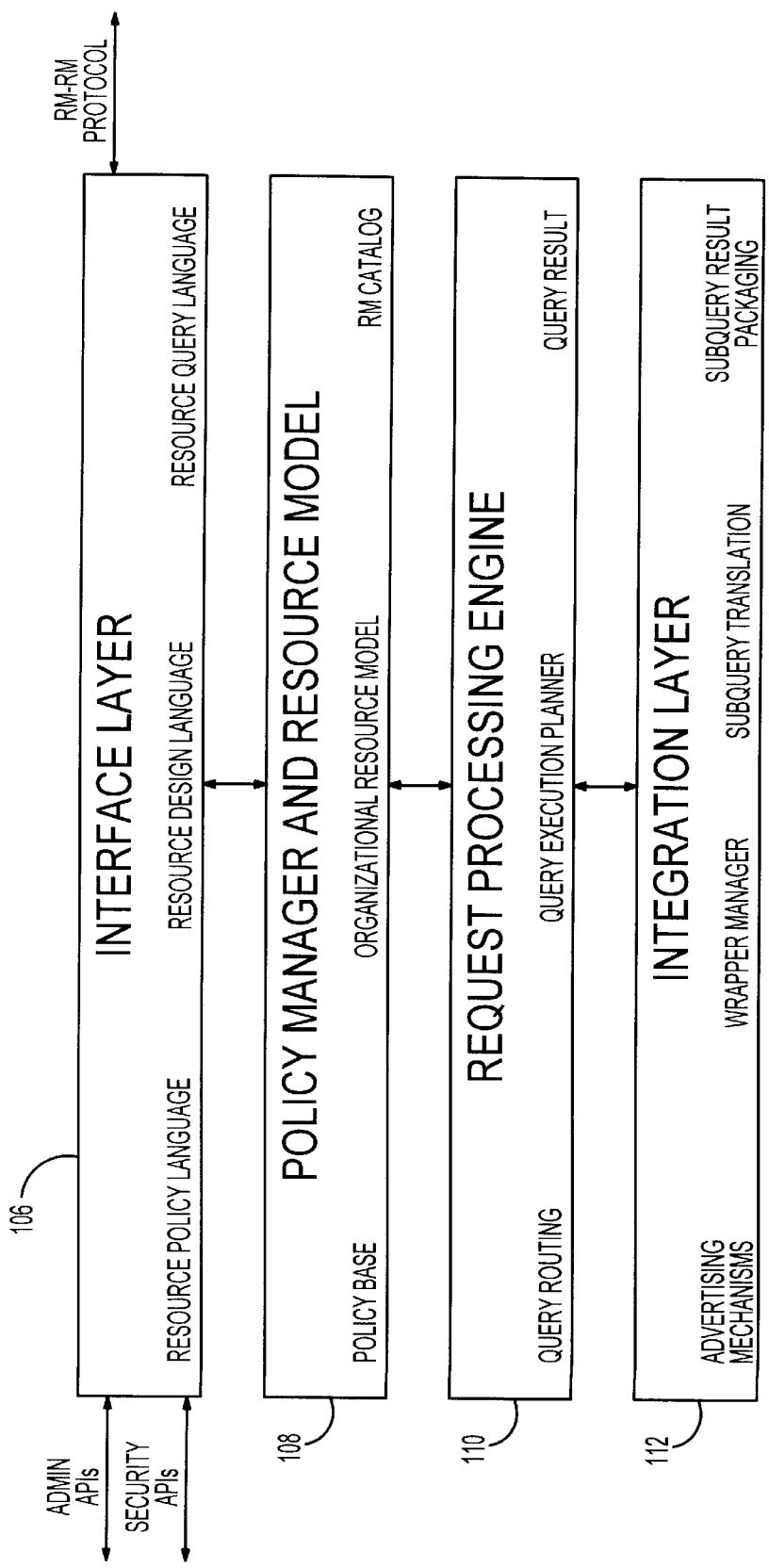
FIG. 4 is a schematic view of layers of a global resource manager of FIG. 2.

Referring now to FIGS. 2 and 4, each ERM 44 and SRM 46–52 has the same four-layer architecture. The four layers are the interface layer 106, the policy manager and resource model layer 108, the request processing engine layer 110, and the integration layer 112. The interface layer 106 allows other components of the system (such as the workflow engine) to send requests to the resource manager in which the interface layer 106 resides. While not critical, the requests are typically written in resource query language (RQL). The layer also allows tools that "speak" resource policy language (RPL) and resource design language (RDL) to manipulate the policies and the underlying resource model. The layer is also used for communication with other ERMs and SRMs. Finally, the interface layer 106 defines the administrative APIs and uses the underlying security mechanisms.

The policy manager and resource model layer 108 implements the policy rules and the resource model that provides the integrated view of resources. This layer also provides a database (RM catalog) with extensible schema that is used to store model and historical information. The RM catalog may also be used to store other information needed for resource management, such as load information for load balancing.

The request processing engine layer 110 receives the actual request after it has been processed by the policy engine. The layer is responsible for routing requests to the appropriate information source. The layer also assembles all of the results that are returned from the information sources.

The fourth layer is the integration layer. This layer manages all of the different protocols spoken by local information sources (i.e., the LRMs). The integration layer allows the LRMs to be advertised. It handles the requests and any result translations that are required. Another responsibility of the integration layer is to manage the wrappers that need to go around each LRM.

Figure 5:
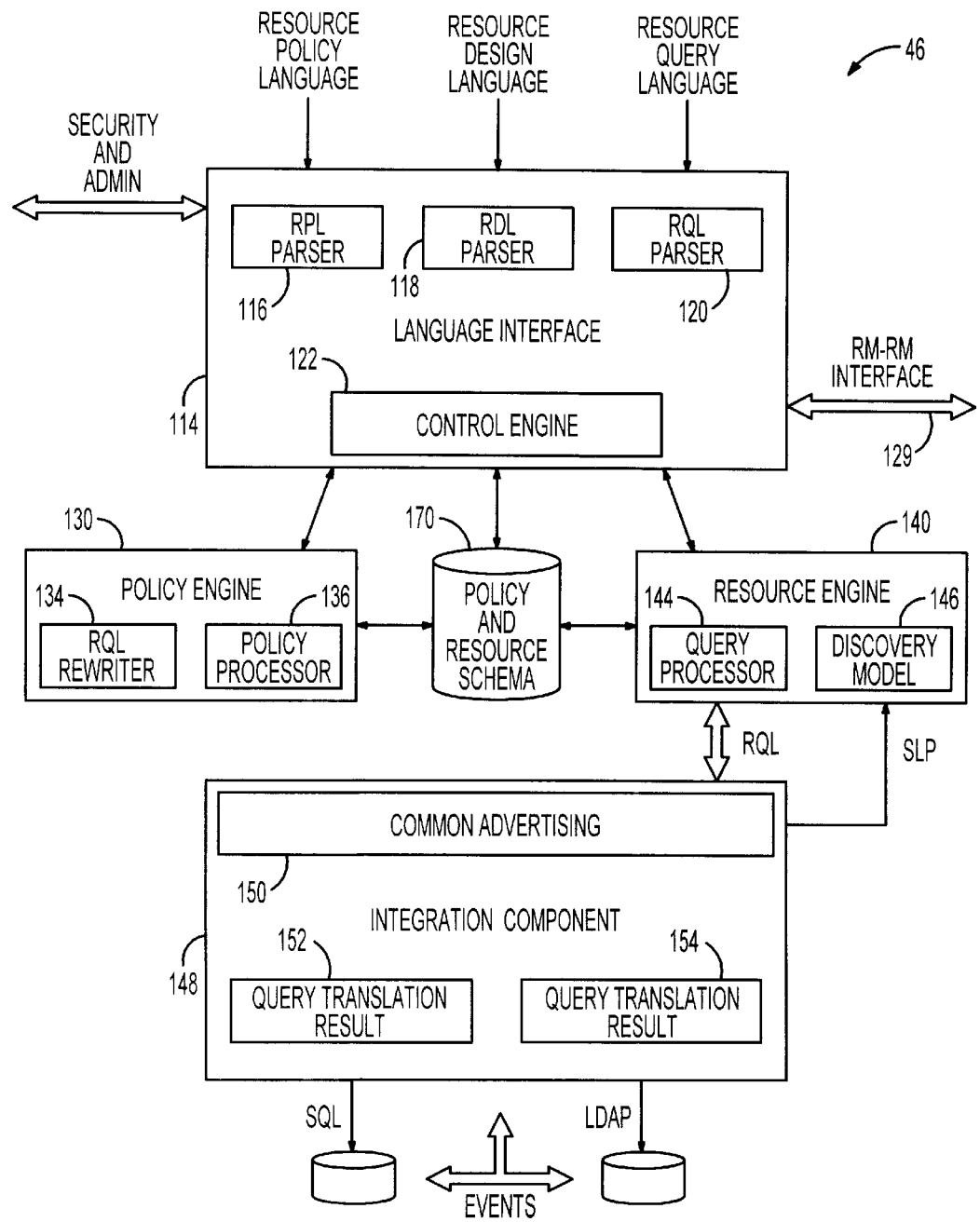
FIG. 5 is a block diagram of the components of the global resource manager of FIG. 4.

The integration diagram of the ERM 44 or one of the SRMs 46–52 of FIG. 2 is shown in FIG. 5. For purposes of description, the resource manager of FIG. 5 is identified as SRM 46 of FIG. 2. One major component of the SRM 46 is the resource manager language interface 114. The language interface includes three parsers 116, 118 and 120 that are used for the three languages identified above (i.e., RPL, RDL and RQL). The languages will be described in greater detail below. The language interface 114 also includes a control engine 122, which controls the process of resolving a resource request.

When a resource request is received at a resource manager, such as the SRM 46, it is first parsed by one of the three language parsers 116, 118 and 120. The resource request is then forwarded to the control engine 122, which initiates the process set forth in FIG. 6.

Figure 6:
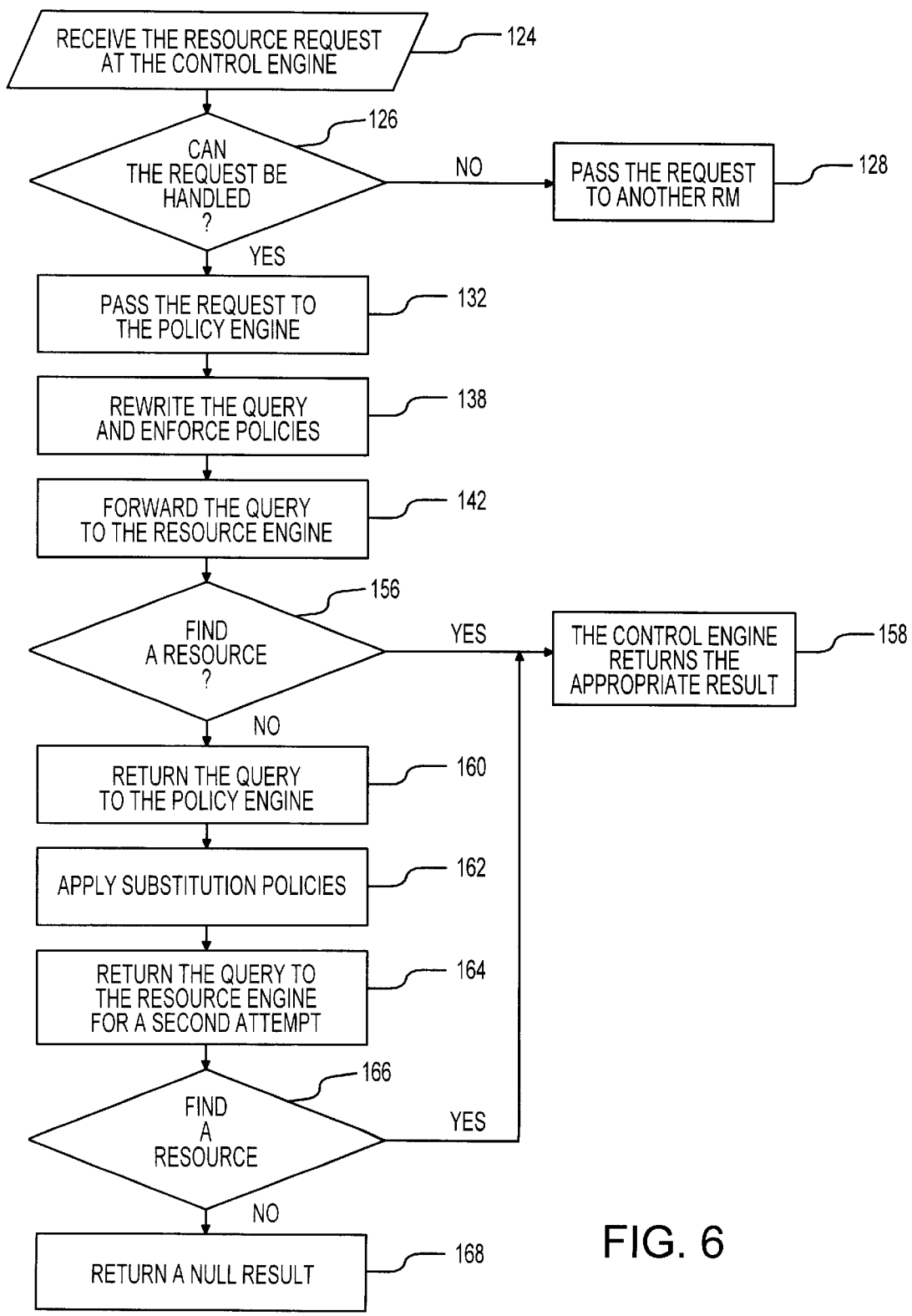
FIG. 6 is a process flow of steps for routing a request for a resource in accordance with the invention.

Referring to FIGS. 5 and 6, at step 124, the resource request is received at the control engine 122 of the SRM 46. In step 126, a determination is made as to whether the request can be handled by the particular resource manager. For example, it is determined whether the SRM is authoritative with regard to the resource that is being requested. By an "authoritative" resource manager, what is meant is that a resource manager is enabled to exercise control over the requested resource. Resource managers are also authoritative over other resource managers, since the resource managers in a higher tier 38 and 40 of FIG. 3 can exercise control over selected resource managers in a lower tier 42. If a negative response is generated, the request is passed to another resource manager at step 128. Referring briefly to FIG. 2, if the resource that is needed to accomplish a particular work item is under the domain of $LRM_2$ 56, the $SRM_1$ 46 will not be authoritative. Therefore, the SRM 46 will refer any request for the resource to the $SRM_2$ 48 at step 128. In FIG. 5, the ability to refer the request to a second resource manager is represented by the resource manager-to-resource manager interface 129.

If a positive response is generated at the decision step 126, the resource request is passed to a policy engine 130, as indicated by the step 132 in FIG. 6. The policy engine 130 includes an RQL rewriter 134 and a policy processor 136. The query is rewritten using known techniques, and policies of the enterprise are enforced at step 138. By providing a policy engine at each resource manager, policies can be adapted for a particular organizational or geographical boundary. For example, one facility of an enterprise may require two approvals for any expense request for an item having a value over a designated dollar value, while another facility of the same enterprise may require only a single approval.

After the policy enforcement, the request is forwarded to a resource engine 140, as indicated by step 142. The resource engine includes a query processor 144 and a discovery model 146. The resource manager 140 cooperates with an integration component to process the query and generate the appropriate result. The integration component 148 is primarily responsible for the functions described above with reference to the integration layer 112 of FIG. 4. The integration component includes a common advertising element 150 and a pair of query translation result elements 152 and 154.

In the decision step 156 of FIG. 6, the determination is made as to whether a resource is available to satisfy the request. As previously noted, the preferred embodiment is one in which LRMs are aware of the availability of particular resources. The information available at the SRM level relates to the capacity of resource types. That is, an SRM has the necessary dynamic information to determine whether a particular group of resources having the same capability is available, but the overhead required to maintain information for each resource within the group is avoided.

If in the decision step 156 it is determined that a resource that satisfies the request is available, the appropriate result is generated and the control engine 122 returns the appropriate result at step 158. On the other hand, when a negative response is generated at the decision step 156, the resource engine 140 returns a NULL and the request is sent to the policy engine 130 at step 160. The policy engine applies substitution policies at step 162. The application of substitution policies provides an increased range of resources that are determined to have a capability of performing the work item for which the original resource request was generated.

At step 164, the query is returned to the resource engine 140 for a second attempt at finding a resource that satisfies the request. At decision step 166, if a resource is found, the control engine 122 is used to generate the appropriate result at step 158. However, if the request cannot be satisfied even though the resource manager 46 has authority over the resource type, a NULL is returned at step 168.

The resource engine 140 is associated with a resource model, which contains a hierarchical collection of concepts representing the resource types. The hierarchical collection is based on capabilities. A resource model defines static behaviors of resource types (e.g., work items that can be performed by the resource types) and the relationships among them. Dynamic behaviors and relationships (e.g., a resource is only allowed to do a work item under certain dynamic conditions) are specified using policies. For each type of resource, the resource model maintains knowledge of "where" to get instances of that type.

The discovery model 146 element "discovers" local resource managers and the types of resources that they handle. The query processor 144 of the resource engine 140 utilizes the discovery model to generate one or more subqueries for the LRMs. The subqueries are then dispatched to the LRMs, where the wrappers convert the request (in RQL) into a format that is understood by the LRMs. A client can talk directly to the resource engine 140 to modify the resource model using RDL. A policy and resource schema is stored as a database 170, which is shared by the resource engine 140 and the policy engine 130.

Figure 7:
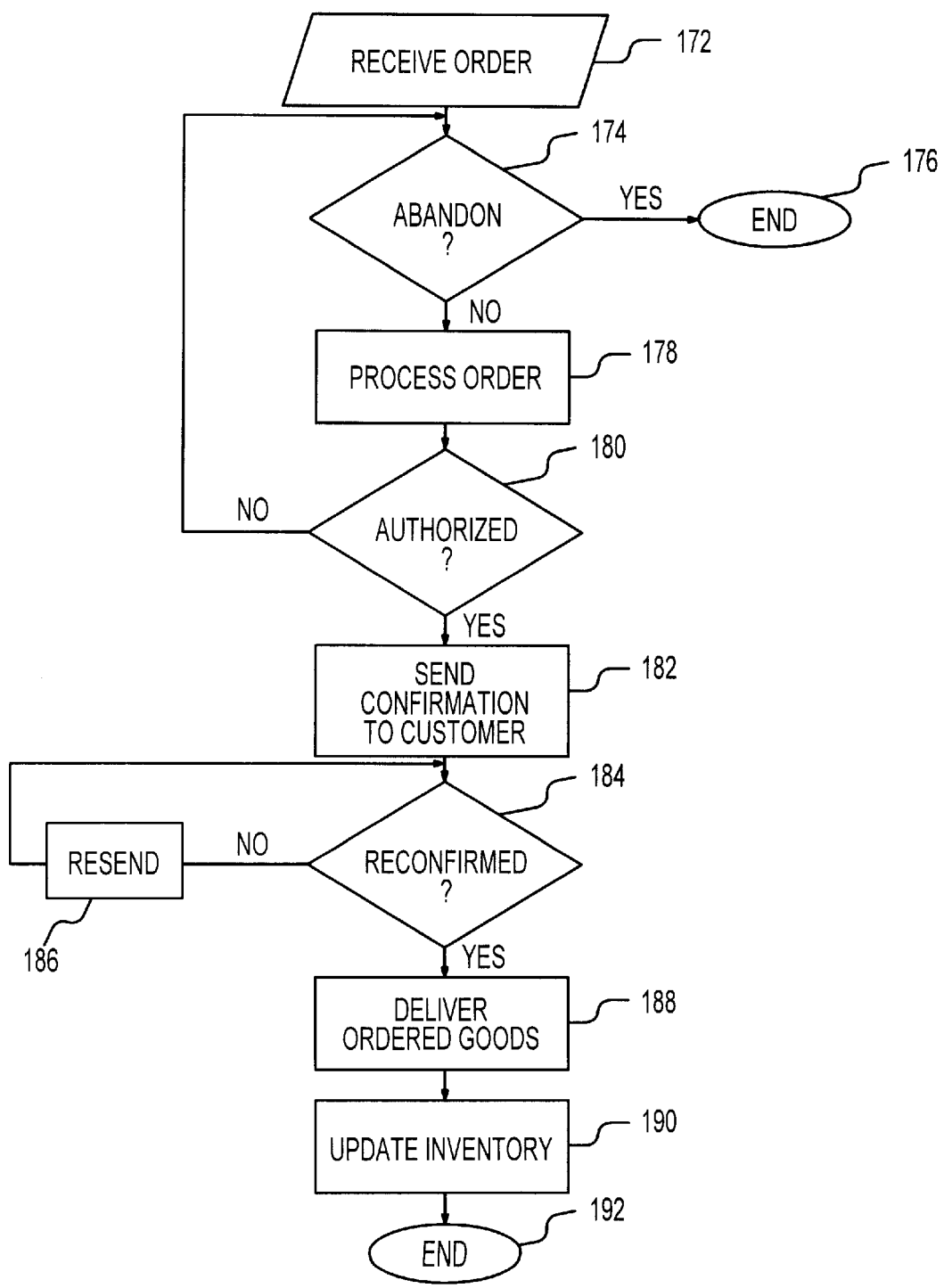
FIG. 7 is a block diagram of an example of a workflow process to be controlled using the resource managers of FIG. 2.

The policy engine 130 receives queries from the control engine 122 and rewrites the queries based on applicable policies. The policy engine also manages the collection of policies, which are stored in the database 170. Policies can be added or updated using RPL. FIG. 7 is an example of a workflow process that can be managed using the WFMS 36 of FIGS. 2 and 5. The WFMS controls the process by identifying what needs to be run, in which order, and by whom. Within a resource manager, such as the SRM 46, the database 170 of policy and resource schema is utilized. The WFMS uses at least one repository of business process rules to identify what the next process activity is and which resource should carry out that process activity. The process repository is populated by imported process models created by business managers and analysts. In FIG. 7, the first step 172 is to receive an order from a customer. In the decision step 174, the appropriate resource is activated to determine whether the order should be abandoned. Abandonment may be dictated by determination that the order was improperly directed. If the order is to be abandoned, the process ends at step 176. Stored policy rules are consulted in the determination of abandonment.

If an affirmative response is generated at decision step 174, the order is processed in step 178. Typically, more than one resource is required to perform this step. A decision step 180 of determining whether the order has been properly authorized is directly related to the processing of the order. Again, the database of policy and resource schema is utilized in performing this step. A determination that the order is not properly authorized returns the workflow process to the determination of whether the order should be abandoned. However, if the order is properly authorized, a confirmation is sent to the customer at step 182.

Optionally, the policy requirements may require the customer to reconfirm the order. In the decision step 184, reconfirmation is verified. When a reconfirmation is not received within a preselected period of time, the confirmation is resent to the customer at step 186. On the other hand, if the reconfirmation is received, the ordered goods are delivered at step 188 and the inventory is updated at step 190, before the workflow process is terminated at step 192.

A number of process activities are often required within each of the steps of FIG. 7. For example, the step 178 of processing the order may require customer details and call details which are acquired using call agents or automated devices, such as interactive voice recognition units (IVR units). The authorization step 180 may require information regarding the amount and the reason for ordering. The step 190 of updating the inventory may require a product code, the quantity and the price of the ordered goods. Acquiring each of these data items for processing and updating requires involvement by resources that must be coordinated.

Figure 8:
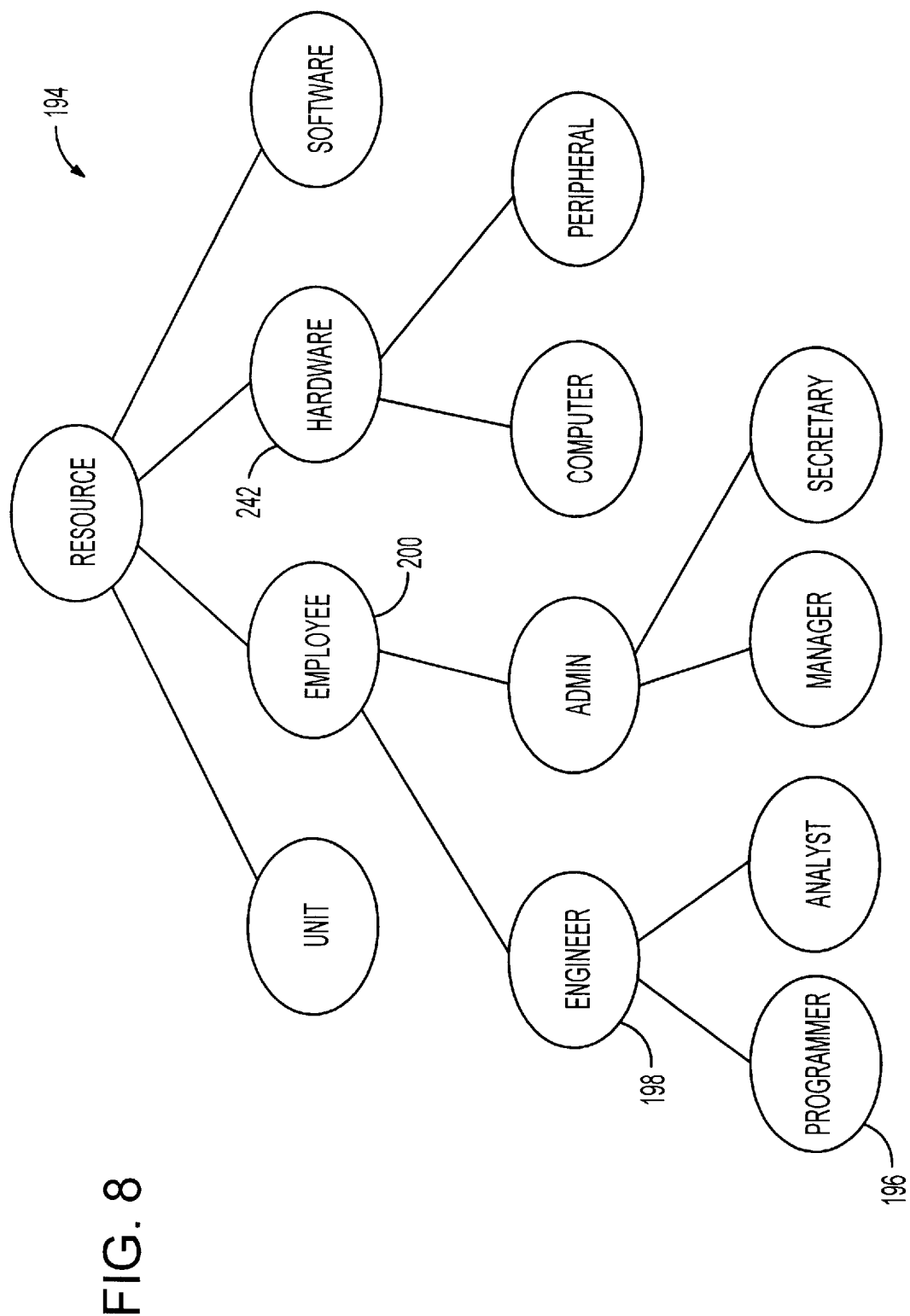
FIG. 8 is a schematic view of a resource hierarchy in accordance with the invention.

As previously noted, the resource engine is associated with a resource model that contains a hierarchical collection of concepts representing resource types. A resource type is intended to denote a set of resource instances with the same capabilities. The resource hierarchy shows resources organized into types. FIG. 8 illustrates a possible resource hierarchy 194. Each of the types in the hierarchy has a list of capability attributes, which represent its capabilities. A resource type inherits these capabilities (attributes) from its parents. For example, in FIG. 8, a Programmer 196 inherits all of the capabilities of its parent Engineer 198. In fact, a Programmer is an Engineer with some special capabilities. In like manner, the Engineer is an Employee 200 having special capabilities, but the Engineer inherits all of the attributes of the Employee resource type.

Each resource type in the hierarchy 194 of a particular resource manager is associated with four fields. The number of fields and the format are not critical to the invention. A preferred embodiment of the field will be described with reference to the Engineer resource type 198. The first field is a DO_ADDR (address). If the resource manager (such as the SRM 46 of FIG. 5) can satisfy requests for the Engineer, then this variable contains an address or addresses of the subordinate LRM(s) that can handle the request. If this list is empty, then the resource manager uses the other fields and utilizes the resource manager-to-resource manager protocol to send the request to another resource manager.

A second field is DELEGATE_ADDR (address). This field provides an address of the resource manager that can satisfy Engineer requests and is lower in the resource manager hierarchy. In such case, requests can be delegated to the identified resource managers.

A third field is the REFER_ADDR (address) field. A cache representing a same level resource manager that has been discovered to be able to satisfy Engineer requests. This discovery is typically made using information returned with a Report message to be described below. The discovered resource managers are GRMs that are located horizontally within the resource manager hierarchy. Such peer resource managers can have the requests Referred to them. It should be noted that there is no guarantee that this cache is consistent with other resource managers. Consistency is achieved over time, as the resource manager uses and updates this cache.

The fourth field is the PLEAD_ADDR (address) field. This field contains addresses of a resource manager that can satisfy Engineer requests and is at a higher level in the resource manager hierarchy. Thus, the Engineer requests can be Pleaded to the higher level resource managers.

The operation of the four fields will be described with reference to the three-level resource manager hierarchy of FIG. 2. In this simplified hierarchy, the SRMs 46, 48, 50 and 52 cannot Delegate, so that the DELEGATE_ADDR field can be left out at the middle level 40. SRMs can only Plead up to the ERM 44. Therefore, the PLEAD_ADDR can be maintained for an SRM, but it need not be maintained for each individual resource type in the resource model. ERMs cannot Plead, so the PLEAD_ADDR field can be left out at this highest level 38. Similarly, the ERMs cannot Refer, so there is no need for a REFER_ADDR field at this level 38.

The hierarchy of resources is built using the capability attributes. These attributes represent capabilities or states of resource types that are inherited at lower levels in the resource type hierarchy. A resource type may also contain attributes that are applicable only to it. Resources lower in the hierarchy do not inherit these non-capability attributes.

The resource types can be created using a subset of UML. Using UML as a modeling language enables the use of existing UML tools that are commercially available. The UML representation can then be turned into code (again using commercially available tools) for better performance. The codified resource types can be compiled directly with the codified protocol above in order to obtain optimal performance.

In order to enable flexible resource specification in process definition, each ERM 44 and SRM 46–52 also contains knowledge of roles. Roles are logical representations of resource requirements for workflow activities in terms of capabilities. Roles are used by activity definers (when creating new activities) to map activities into resources. Roles may be a boolean expression specifying the resource types needed for the activity. Given this information, the resource manager automatically generates virtual nodes, such as the nodes that are shown as being shaded in FIG. 9, which is the resource hierarchy 194 of FIG. 8, but with the hierarchy extended with roles. For example, assume that the activity definer defines two roles $R_1$ and $R_2$ for activities $A_1$ and $A_2$ as follows:

$A_1$:{Role:$R_1$={Peripheral and Software}}
$A_2$:{Role:$R_2$={(Programmer and Analyst) and (Computer or Secretary)}}

Figure 9:
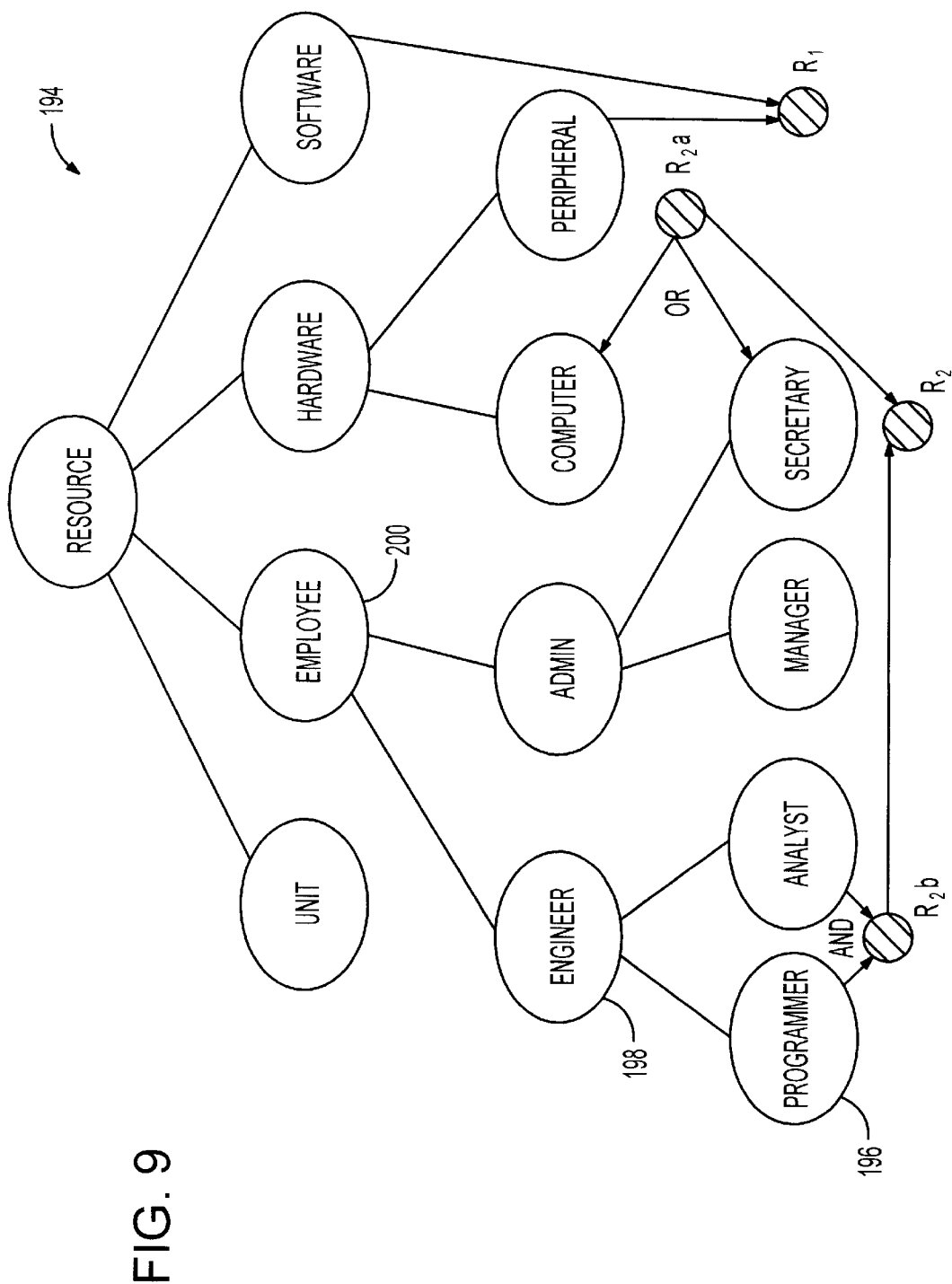
FIG. 9 is a schematic view of the resource hierarchy of FIG. 8, but with definitions of roles.

FIG. 9 shows how the above Roles would be incorporated into the resource model. $R_1$ can be modeled very simply as inheriting from both Peripheral and Software. $R_2$ requires the definition of two "virtual" resources, i.e., $R_2$a and $R_2$b. $R_2$a represents a set of resources that are either Computers or Secretaries. $R_2b$ represents resources that are both Programmers and Analysts. Finally, $R_2$ represents an "and-ing" of $R_2a$ and $R_2b$. This method allows for complex boolean expressions of resource types to be expressed in the resource model. Moreover, the virtual nodes can have additional attributes that can be used during the search process.

The connections between virtual nodes and resource types are labeled in order to enable the late and early finding of resources. For example, in the example of Role $R_1$, the link between $R_1$ and Peripheral might be labeled for late binding. When a request for Role $R_1$ comes into the resource manager, the request would be rewritten by the appropriate policies. However, the request would not be sent to the LRMs.

The virtual nodes (roles) also consist of rules that are to be used to determine the relationships between the resource types that they represent. For example, a virtual node may be referred to as SecureContact, which represents a Manager resource type and a secure WorkListHandler. That is, if one needed to send secure work to a Manager, the SecureContact role could be used. Nevertheless, the resource manager would require rules to determine how to obtain (and in which order) the WorkListHandler, etc. These rules are only stored in the virtual nodes and thus are only associated with Roles, not resource types. Role definition would also need to be merged into the resource model. This is likely to be possible using UML. Once role knowledge is represented in the model, ERMs and SRMs can be queried based solely on roles.

There are number of relatively simple languages which have been identified for resource definition, query and manipulation. These languages include RQL, RPL, and RDL. The resource query language is an SQL-like language. Users can employ the language to submit resource requests to a resource manager. The language is composed of SQL "select" statements augmented with optional activity specifications ("for" clauses). An example follows:

| select | $R_2b$ |
|--------|--------|
| from   | $SRM_n$ |
| where  | Location='PA' |
| for    | Programming |
| With   | NumberOfLines=35000 And Location='Mexico' |

This exemplary query requests resources of role $R_2b$ from $SRM_n$, with the additional condition that resources should be located at 'PA.' The resources are for the activity Programming of 35000 lines of code and of Location 'Mexico.' Note that the "select" clause may contain either a resource type (such as Programmer) for simple workflow activities that only require a single resource, or a role specification, such as $R_2b$ for complex activities that require multiple resources. For resource specifications in a workflow activity, only the "select" clause is mandatory.

The resource policy language (RPL) allows managers and supervisors to define resource policies. The two types of policies are requirement policies and substitution policies. A requirement policy defines additional conditions that a resource must satisfy in order to perform a given workflow activity. A substitution policy specifies possible substituting resources for a given workflow activity in case the originally specified primary resource is not available.

The third language identified with respect to the interface layer 106 of FIG. 4 is the resource definition language (RDL). RDL allows for graphical modeling and manipulation of resource groups. Also shown in FIG. 4 are three interfaces for resource management. A security interface allows each GRM (i.e., ERM or SRM) to use an available security architecture. The administration API allows the administration and configuration of the GRM. The RM-RM (resource manager-to-resource manager) protocol is a set of messages that allows one GRM to contact another GRM. This interface can enable decentralized resource management and may allow for the use of a foreign router by putting an appropriate wrapper around it.

Figure 10:
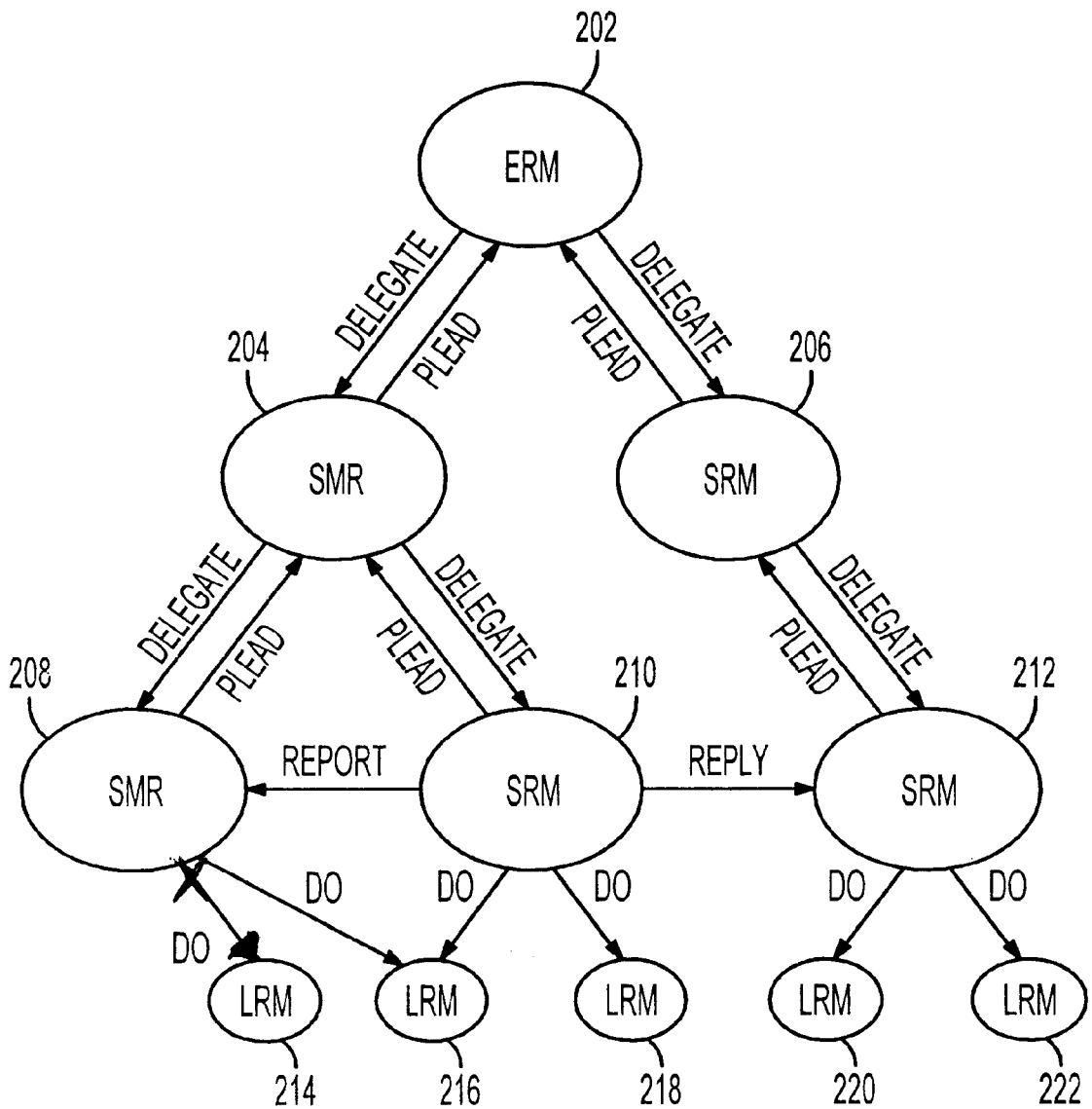
FIG. 10 is a schematic view of a communication protocol among resource managers in accordance with the invention.

As previously noted, there are a number of messages within the RM-RM protocol. The messages include Plead, Delegate, Refer and Report. These messages are illustrated in FIG. 10. It should be noted that the Do message is not part of the RM-RM protocol, since an SRM by definition can access LRMs. The Plead message is used by the GRM to send a message to a higher level GRM. In FIG. 10, the highest level GRM is ERM 202. At a next highest level are SRMs 204 and 206. The lowest level GRMs are the SRMs 208, 210 and 212.

A Delegate message is used by a GRM to send a request down to a lower GRM. A Refer message allows a GRM to pass a request to another GRM that is on a same level cache information, such as the SRM 210 being on the same level as SRM 212. A Report message is a response sent back to the original GRM at which a request is originated. This Report message is used to create and update cache entries at the original GRM.

The RM-RM protocol can be simplified for the three levels of resource management, as represented in FIG. 2. With three levels of resource management, the top level ERM 44 can either Delegate or can Do the request. The second level 40 of SRMs 46–52 can Plead, Refer or Do a request. In the simplest case, the SRM, such as $SRM_2$ 48 satisfies the request by using an LRM, such as $LRM_2$ 56. However, if the $SRM_2$ 48 is not capable of satisfying the request, it pleads up to $ERM_1$ 44. The ERM maintains high level information about which SRMs are able to satisfy which requests. Therefore, the ERM can Delegate the request to $SRM_3$ 50, which uses $LRM_4$ 60 to satisfy the original request. The $SRM_3$ 50 then replies directly to $SRM_2$ 48 using the Report message. $SRM_2$ can create a cache entry to send all requests for this resource type directly to $SRM_3$.

In a third possible situation, $SRM_2$ 48 receives the request and uses its cached entry to send the request to $SRM_3$ 50, using the Refer method. However, if $SRM_3$ cannot handle the request (e.g., an invalid cache entry), $SRM_3$ might also have a cache entry for the request. In the preferred embodiment, the $SRM_3$ Pleads the request to the ERM 44. This is preferred because, while the cache entry would allow $SRM_3$ to Refer to another SRM the second Refer call might lead to messy loops as a result of inconsistent caches. By allowing only a Plead following a Refer, there is less of an emphasis on cache consistency protocols. ERM 44 delegates the request to the SRM which is able to satisfy the request and Reports directly back to $SRM_2$. At this point, the originating SRM (i.e., $SRM_2$) can update its cached entry.

Figure 11:
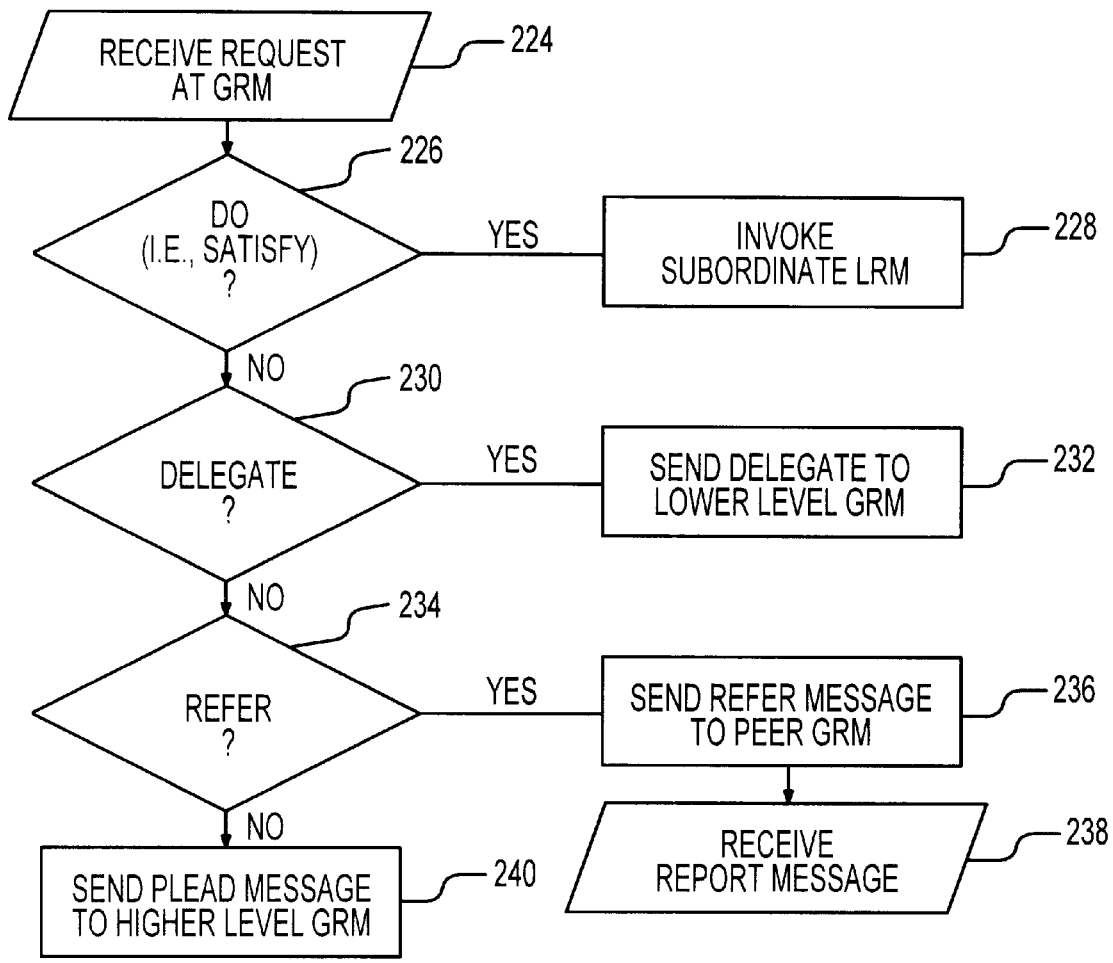
FIG. 11 is a process flow of steps for utilizing the messages of FIG. 10.

The ordering of the priority of messages can be important in many applications. FIG. 11 is a preferred ordering. In step 224, a resource request is received at a GRM, such as $SRM_1$ 46 in FIG. 2. The GRM first attempts to Do the request. If it is determined at step 226 that the request can be satisfied, the subordinate LRM 54 is invoked at step 228. However, if the GRM is unable to satisfy the request, the GRM attempts to Delegate the request to a lower level GRM, as represented by steps 230 and 232. In the three-level system 36 of FIG. 2, the SRM 46 is unable to Delegate. Only the ERM 44 can Delegate to a lower level GRM. Consequently, in the ordering of FIG. 11, the SRM 46 attempts to use its cached entries in order to Refer the request to a peer GRM, such as SRM$_2$ 48. If an affirmative response is generated at the decision step 234, the Refer message is sent at step 236 and the originating GRM awaits a Report from the refer GRM. The reception of the Report is indicated at step 238. Finally, if the GRM is unable to refer the request, the request is Pleaded to a higher level at step 240. In the three-level architecture of FIG. 2, only the SRMs 46–52 may Plead requests.

The following are some of the rules that are to be followed for each of the messages to guarantee that no loops occur while traversing the hierarchy of resource managers. This simplifies the implementation of the RM-RM protocol and requires little external coordination.

Request
    If can_Do then {DO; Reply}
    Else if can_Delegate then {Delegate}
    Else if can_Refer then {Refer}
    Else if can_Plead then {Plead}
    Else {Report error}
    Reply
    Return result to initiator of Request
    Do (outlined in control engine section above)
    Ask policy engine for initial query rewrite
    Ask resource engine for result
    If any result then return result
    Else ask policy engine for substitute rewrite
    Ask resource engine for result and return
    Delegate
    If can_Do then {DO; Report result}
    Else if can_Delegate then {Delegate}
    Else {Report error}
    Plead
    If can_Do then {DO; Report}
    Else if can_Delegate then {Delegate}
    Else if can_Plead {Plead}
    Else {Report error}
    Refer
    If can_Do then {DO; Report}
    Else if can_Delegate then {Delegate}
    Else if can_Plead then {Plead}
    Else {Report error}
    Report
    Update refer table and Reply result The can_DO functionality involves looking to the resource model, as previously described. The other test cases (can_Refer, can_Delegate, etc.) can also be determined using the parameters of the resource model.

The final issue that is to be addressed is the consistency issue. The resource model is loosely consistent among all of the resource managers. This means that at any given time, there might be GRMs that have different models, but over time all the GRMs will have the same resource model.

One exception to the statement of loose consistency is the consistency of the model between the SRMs and ERMs. If the model is changed in one of the SRMs, the ERMs are immediately notified, while the models in the other SRMs can be updated over time. This is required because other SRMs will be Pleading requests up to the ERMs, which need a complete and consistent knowledge of the entire system.

If there is only one ERM and the subordinate peer SRMs are inconsistent, the resource models at the SRMs will be subsets of the ERM resource model. Referring again to FIG. 8, assume that a first SRM (SRM$_1$) can satisfy requests of resource type Hardware 242, but does not have any knowledge of any other resource types. If a request for any other resource type is received at the first SRM, the SRM pleads the request to the ERM. Thus, when a request is received for the Employee type 200, SRM$_1$ pleads to the ERM, which delegates the request to a second SRM (SRM$_2$). After the request is satisfied by SRM$_2$, the appropriate Report is generated and directed to SRM$_1$. Based upon the information in the Report, SRM$_1$ can update its model and cache. In this way, the resource model of both SRMs can be built up over time and eventually the resource model will be consistent among the SRMs and the ERM.

What is claimed is:

1. An automated method of managing distributed resources for a workflow process of executing a coordinated set of process activities requiring said distributed resources, said automated method comprising steps of:

forming a hierarchy of resource managers that are operatively associated to provide multi-level control of said resources, at least one level of said hierarchy having more than one resource manager; and enabling communication among said resource managers in response to requests for said resources, said communication that is responsive to a specific request for said resources including:

(1) sending a Delegate message to a resource manager at a lower level of said hierarchy if a resource manager that receives said request is authoritative with regard to a lower level resource manager that can invoke a requested resource, said Delegate message being specific to and including said request;

(2) sending a Refer message to a resource manager at a same level if said resource manager that receives said request is not authoritative and is configured to include an identification of a same level resource manager that is authoritative with regard to said request, said Refer message being specific to and including said request; and (3) sending a Plead message to a resource manager at a higher level if said resource manager that receives said request is not authoritative and is not configured to send said Refer message to said same level resource manager, said Plead message being specific to and including said request.

2. The automated method of claim 1 wherein said communications further include:

sending a Report message to said resource manager that receives said request following a Plead message, said Report message including an identification of a same level resource manager that is authoritative with regard to said request.

3. The automated method of claim 2 further comprising a step of storing resource data at each resource manager such that each said resource manager includes at least a portion of an enterprise-wide view of accessible resource capabilities, each said resource capability of which a specific resource manager is configured to identify having stored resource data indicative of:

(a) ability of said specific resource manager to satisfy a request for said resource capability;

(b) a Delegate address of a lower level resource manager which can satisfy a request for said resource capability;

(c) a Refer address of a same level resource manager which can satisfy a request for said resource capability; and (d) a Plead address of a higher level resource manager to which a Plead message can be sent.

4. The automated method of claim 1 wherein said communications further include:

sending a Do message if said resource manager that receives said request is enabled to satisfy said request.

5. The automated method of claim 1 further comprising a step of storing policy data at each said resource manager, said policy data being indicative of selecting particular resources in response to said requests, said policy data being specific to said resource manager at which said policy data is stored.

6. A system for managing distributed resources for workflow processing within an enterprise of interest comprising:

an upper level resource manager having stored data indicative of an enterprise-wide representation of resource capabilities to perform process activities for workflow processes of said enterprise;

a plurality of middle level resource managers that are subordinate to said upper level resource manager with respect to invoking said resource capabilities, said middle level resource managers having stored data indicative of portions of said enterprise-wide representation, each said middle level resource manager being related to a different portion of said enterprise-wide representation; and a plurality of base level resource managers that are subordinate to said middle level resource managers with respect to invoking said resource capabilities, said base level resource managers having stored data indicative of specific resource instances for providing said resource capabilities, said resource instances being divided and assigned to said base level resource managers at least partially based on types of said resource capabilities, said base level resource managers being assigned to said middle level resource managers in an arrangement which defines said different portions.

7. The system of claim 6 wherein said stored data of said middle level resource managers in indicative of said types of resource capabilities and is not indicative of said specific resource instances.

8. The system of claim 7 wherein said stored data of said middle level resource managers is indicative of current availability of said types of resource capabilities and wherein said stored data of said base level resource managers is indicative of current availability of said resource instances, said current availabilities being specific to present ability to perform process activities.

9. The system of claim 8 wherein each middle level resource manager includes data that identifies policies regarding invoking said base level resource managers to invoke a resource instance of a particular type.

10. The system of claim 6 further comprising a plurality of intermediate level resource managers that are subordinate to said upper level resource manager and authoritative to said middle level resource managers, thereby providing at least four distinct levels of resource managers, each said intermediate level resource manager being authoritative to selected middle level resource managers and having stored data indicative of an integration of said portions related to said selected middle level resource managers.

11. An automated method of managing distributed resources for a workflow process of executing a coordinated set of process activities requiring said distributed resources, said automated method comprising steps of:

assigning said resources into a plurality of groups;

forming a base level of resource managers having a plurality of local resource managers (LRMs), including associating each said LRM with at least one of said groups such that each said LRM is authoritative over at least one but not all of said groups with respect to invoking said resources within said groups, including storing data at each said LRM relating to availability status and capability of each said resource in said group over which said LRM has authority;

forming a middle level of resource managers having a plurality of site global resource managers (SRMs), including associating each SRM with at least one but not all of said LRMs such that said SRMs are authoritative over said LRMs with respect to invoking said LRMs, including storing data at each said SRM relating to availability and capability of each said group associated with an LRM over which said SRM has authority; and forming an upper level of resource managers having at least one enterprise global resource manager (ERM), including associating each said ERM with each said SRM such that said ERM is authoritative over said SRMs with respect to invoking said SRMs, including storing data at each said ERM relating to capabilities of said SRMs to invoke said LRMs.

12. The method of claim 11 further comprising a step of forming an intermediate level of more than one first SRM that is subordinate to each said ERM, including associating each first SRM with at least one but not all of said SRMs of said middle level such that said first SRMs are authoritative with respect to invoking said SRMs of said middle level.

13. The method of claim 12 wherein said steps of forming said middle, intermediate and upper levels include providing each said ERM and SRM with information regarding capabilities of SRMs and LRMs over which said ERM and SRM are authoritative, each said ERM thereby having said information relating to all said SRMs and LRMs.

14. The method of claim 13 wherein said steps of forming said middle, intermediate and upper levels further include leaving said SRMs and ERMs without information regarding said availability status of individual resources in said groups, said information regarding said availability of individual resources thereby being limited to storage at said base level.

15. The method of claim 11 wherein said steps of forming said resource managers of said middle and upper levels include storing policies at each SRM and ERM relevant to executing said process activities, wherein said policies are specific to each said SRM and ERM.

16. The method of claim 15 wherein said step of storing said policies further includes storing substitution policies at each said SRM, said substitution policies of a specific SRM being indicative of selection of a second group of said resources upon determination that a resource for executing a particular process activity is not accessible to said specific SRM at which a request is processed, said request being specific to execution of said particular process activity.

17. The method of claim 11 further comprising a step of exchanging requests for resources among said resource managers, said requests being exchanged as messages, including exchanging (1) Delegate request messages to lower level resource managers, (2) Refer request messages to same level resource managers, and (3) Plead request messages to higher level resource managers.

18. The method of claim 17 wherein said step of exchanging requests includes enabling Report messages having information regarding which groups of said resources are accessible via which SRMs, each said message including an address of a resource manager to which said message is directed.

* * * * *